(No Model.)
J. M. DODGE.
CONVEYER TROUGH.
No. 512,015. Patented Jan. 2, 1894.
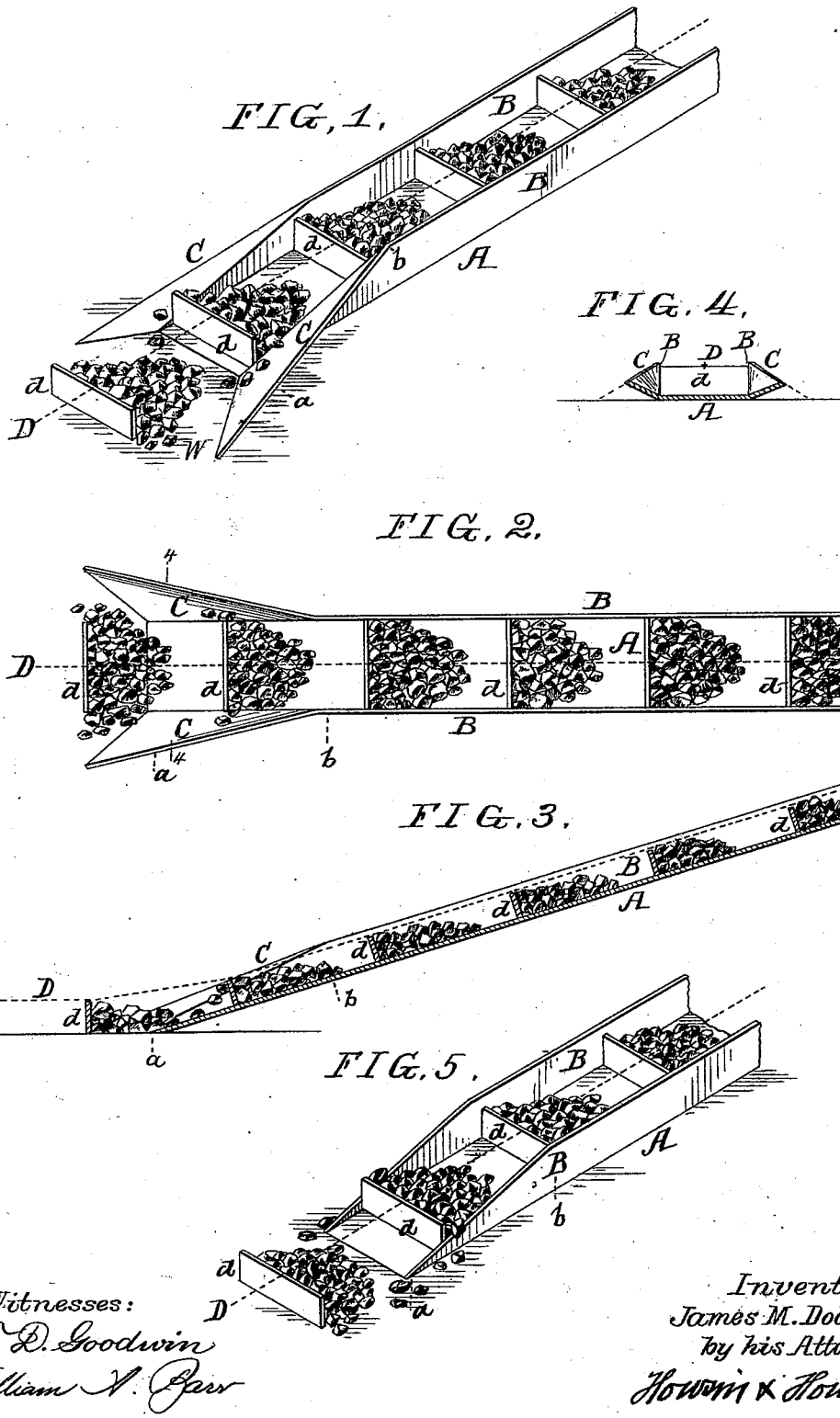
Witnesses:
F. D. Goodwin
William N. Barr
Inventor:
James M. Dodge
by his Attorneys
Howson & Howson

UNITED STATES PATENT OFFICE.

JAMES M. DODGE, OF PHILADELPHIA, PENNSYLVANIA, ASSIGNOR TO THE DODGE COAL STORAGE COMPANY, OF NAUGATUCK, CONNECTICUT, AND PHILADELPHIA, PENNSYLVANIA.

CONVEYER-TROUGH.

SPECIFICATION forming part of Letters Patent No. 512,015, dated January 2, 1894.

Application filed September 25, 1893. Serial No. 486,359. (No model.)

*To all whom it may concern:*

Be it known that I, JAMES M. DODGE, a citizen of the United States, residing in Philadelphia, Pennsylvania, have invented certain Improvements in Conveyer-Troughs, of which the following is a specification.

The object of my invention is to so construct a conveyer trough that material being conveyed will not jam between the end of the trough and the conveyer flights, when the flights are entering the trough. This object I attain in the following manner, reference being had to the accompanying drawings, in which—

Figure 1 is a perspective view illustrating my invention. Fig. 2 is a plan view of the trough. Fig. 3, is a longitudinal sectional view of the trough. Fig. 4, is a transverse sectional view on the line 4—4, Fig. 2. Fig. 5, is a view of a modification of the invention.

Conveyers are constructed in which the troughs have vertical sides, and the conveying flights are made quadrangular to fit the troughs, but this style of conveyer is used where the material is fed into the trough from the top, and used for conveying grain and like material; but in conveying coal and rock, the usual form of conveyer is one in which the sides are arranged at an incline, and the flights are less in width than the trough to prevent the jamming of the material and the breaking of parts of the machinery; but this arrangement allows a certain amount of the material conveyed to work to the sides of the conveyer free from the control of the flights, so that the flights will not carry a full load of material. Therefore, I have found that a conveyer trough having vertical sides is the best form of conveyer trough to use, but when the material is to be carried by the flights from a floor into the trough it would be impossible to use the ordinary construction of conveyer trough, as the coal, or other rock, would jam between the upright edge of the conveyer trough and the edge of the flight, and either the flight would have to twist sufficiently to pass the material or the machine or the lump of material would be broken. I overcome the above objection in the following manner, reference being had to Figs. 1, 2, 3 and 4 of the drawings:

A is the trough having sides B, B, and from the end *a* to a point *b* at a sufficient distance from the end of the trough I bend down the sides B so as to form inclines C, at such an angle that the coal cannot possibly jam between the edges of the flights and the sides of the conveyer trough. The portions C also incline toward the trough, as shown in the transverse sectional view, Fig. 4, so that while the material will be pushed away from one flight, it will return into the trough in front of the succeeding flight owing to the angle of the inclined portion C. The flights *d* are secured in the ordinary manner to a chain or rope D, shown by dotted lines.

W is a table or platform over which the material is carried to the trough A, which is generally arranged at an incline shown in Fig. 3, so as to elevate the material to discharge it into storage bins, cars or boats. When the trough is inclined I preferably extend the portion C beyond the end *a* of the bottom of the trough so as to form a mouth for the trough, as clearly shown in Fig. 1.

My invention is especially applicable for use in conveyers where the material is taken from a horizontal pivoted conveyer, over a platform W and up the inclined trough, such an apparatus being described in the patent granted to me on the 7th day of June, 1892, No. 476,616. It will be seen that as the flight with a load of material in front of it enters the trough some portions of the material will naturally extend beyond the edges of the flight and will come into contact with the inclined portion C, the incline being such that it will elevate the material and either move it within the limits of the trough or dislodge it to such an extent that it will move upon the incline portion and fall back of the flight to to be taken up by the succeeding flight; after the flight reaches the point *b* it will be impossible for the material to become jammed between the edge of the flight and the sides of the trough as the flights fit snugly between the sides. In Fig. 4, I have shown the sides of the trough cut away instead of bent over.

In this instance the material will fall away from the control of the conveyer, but this construction will prevent the breaking of the parts.

While I have shown the sides of the trough vertical they may be slightly inclined without departing from my invention. The edges of the flights, however, must so fit the trough that the material cannot become jammed between the flights and the trough.

I claim as my invention—

1. A conveyer trough having upright sides and a beveled end, the bevel being at such an angle as to prevent the jamming of the material between a conveyer flight and the trough, substantially as described.

2. The combination in conveying apparatus, of the floor, a trough having upright sides, said sides being beveled at the admission end of the trough, with a flighted conveyer chain, the flights of said chain fitting the trough and adapted to convey material from the platform into the trough, substantially as described.

3. The combination in conveying apparatus, of the trough having upright sides, said sides being turned down at the delivery end forming an inclined plane on each side of the trough, with conveyer flights adapted to carry material into the trough, substantially as described.

4. The combination in conveying apparatus, of the trough having upright sides, said sides being turned down at the delivery end forming an inclined plane on each side of the trough, the planes being also inclined toward the trough so that material will return to the trough, with conveyer flights adapted to carry material into the trough, substantially as described.

5. The combination of the horizontal floor or platform, a conveyer trough having upright sides and inclined end portions extending beyond the bottom of the trough, conveyer flights secured together, and adapted to fit the conveyer trough, and carry material from the floor or platform into the conveyer, substantially as described.

In testimony whereof I have signed my name to this specification in the presence of two subscribing witnesses.

JAMES M. DODGE.

Witnesses:
WILLIAM A. BARR,
JOSEPH H. KLEIN.